No. 766,977. PATENTED AUG. 9, 1904.
C. P. STEINMETZ.
VARIABLE SPEED DIRECT CURRENT SHUNT MOTOR.
APPLICATION FILED MAR. 20, 1902.
NO MODEL. 2 SHEETS—SHEET 1.

Witnesses:

Inventor:
Charles P. Steinmetz.
by Albert G. Davis
Atty.

No. 766,977.

Patented August 9, 1904.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

VARIABLE-SPEED DIRECT-CURRENT SHUNT-MOTOR.

SPECIFICATION forming part of Letters Patent No. 766,977, dated August 9, 1904.

Application filed March 20, 1902. Serial No. 99,179. (No model.)

*To all whom it may concern:*

Be it known that I, CHARLES P. STEINMETZ, a citizen of the United States, residing at Schenectady, county of Schenectady, State of New York, have invented certain new and useful Improvements in Variable-Speed Direct-Current Shunt-Motors, of which the following is a specification.

This invention relates to electric motors; and its object is to enable the speed of a direct-current multipolar shunt-motor to be varied and controlled within wide limits. Such a motor is useful in many applications, but especially in driving large printing-presses, where considerable variation in speed is desirable and the different speeds must be maintained constant irrespective of the load.

The principal feature of novelty in my invention is the fact that the armature-winding is composed of open-circuited sections, preferably three for each pair of poles. The adjacent ends of adjoining sections are connected to two corresponding segments of two segmental rings. For each pair of poles I provide a group of brushes insulated from each other and from the frame of the machine and each arranged to connect the corresponding segments in the two rings as they pass under said brush. The brushes are so spaced that the sections of armature-winding between the poles in any given pair of poles are connected, while the section or sections between every two pairs of poles are left open. At each pole is a commutator-brush bearing on the commutator to whose segments the armature-coils in each section are connected, as usual. The result is that there are as many separate armature-circuits as there are pairs of poles. For instance, a twelve-pole machine will have six distinct armature-circuits. By means of a suitable controller these circuits can be grouped in various ways, either in series for low speed, series multiple for intermediate speed, or multiple for full speed.

Figure 1:
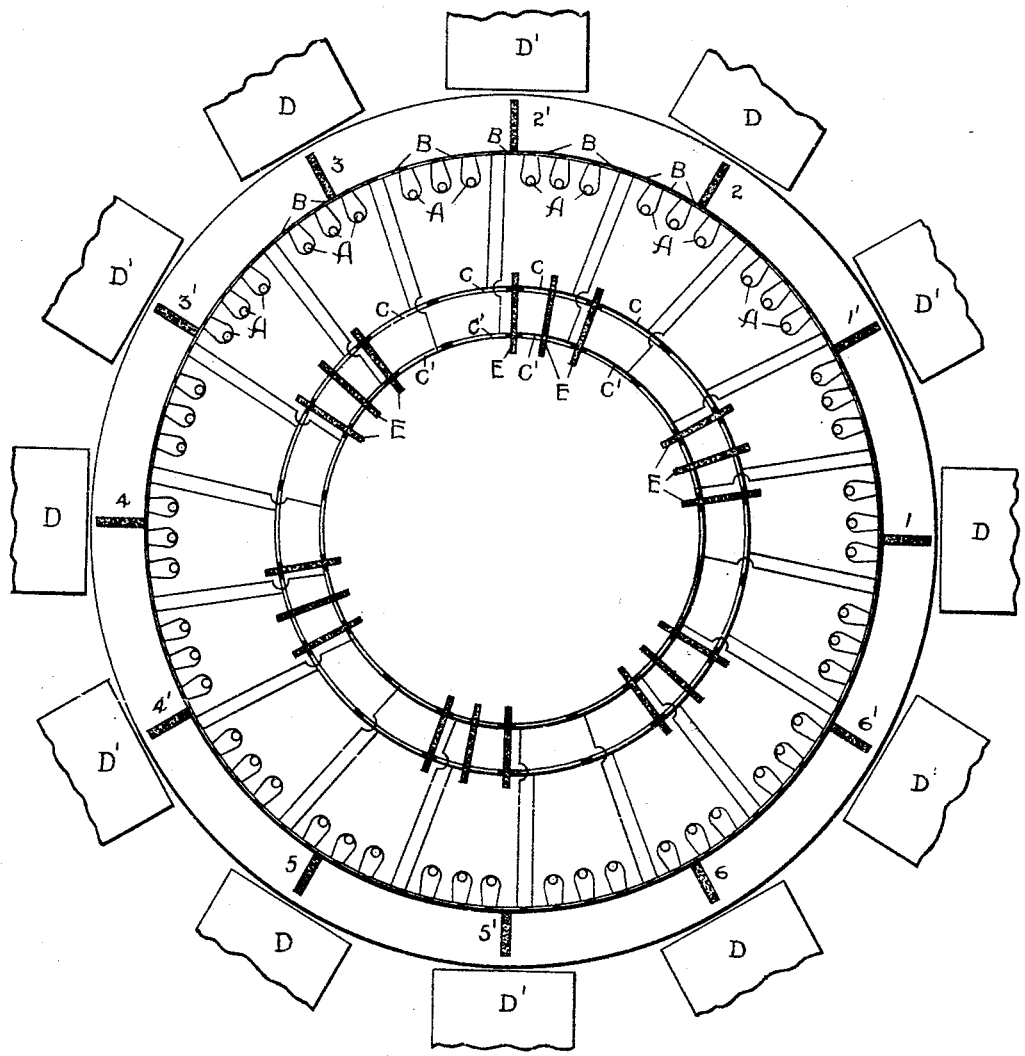
Figure 2:
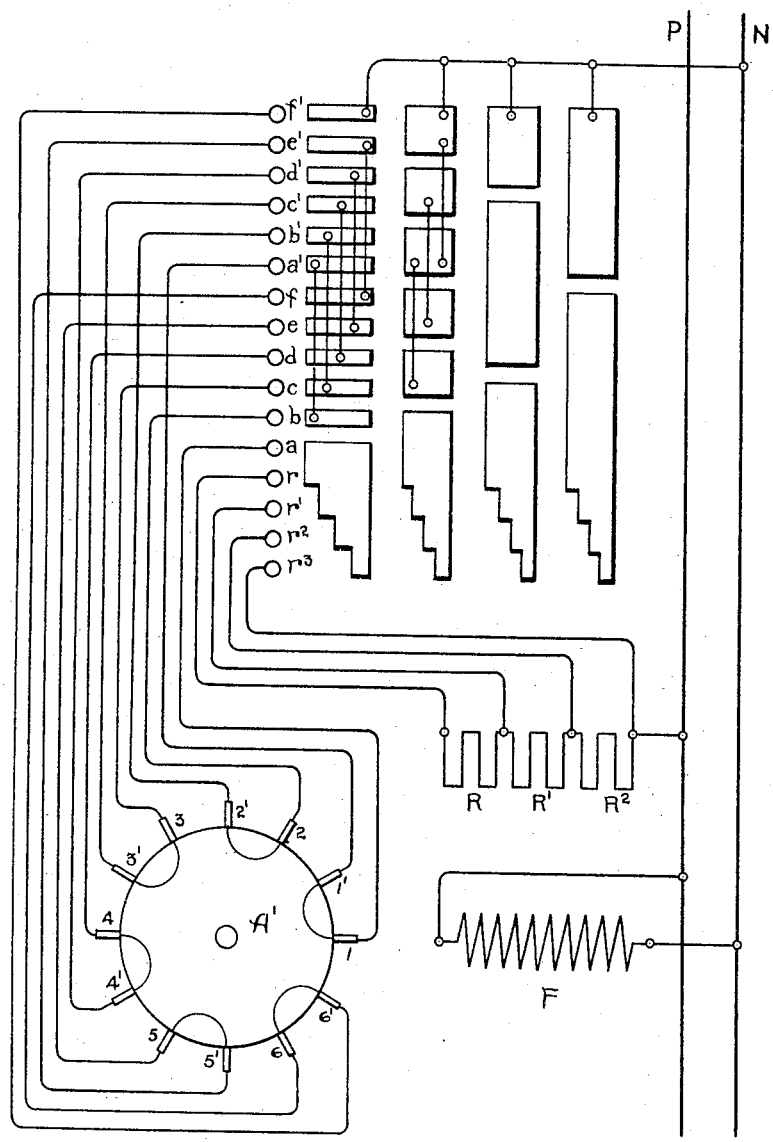

In the accompanying drawings, Figure 1 is a diagram of the windings on a twelve-pole shunt-motor embodying my invention, and Fig. 2 is a diagram of the controller-circuits.

The armature-coils A are connected with the commutator-segments B and are divided in the twelve-pole machine illustrated into eighteen sections, or three for each pair of poles. The ends of adjacent sections are connected with corresponding segments C C' in two parallel segmental rings, there being as many segments in each ring as there are sections in the armature.

The commutator-brushes 1 1', 2 2', &c., are twelve in number, so that each pair of poles D D' has two brushes, between which lies a certain portion of the commutator. In order to close the circuit through those sections of the armature-winding which are included in each of these portions, there is provided for each pair of poles a group of brushes E, preferably three in number, each insulated from the rest and bridging the annular space between the two segmental rings. The length of the segments C C' is such that they extend over only about three-fourths of the angular space occupied by the commutator-segments for any given section of winding. The three brushes E are spaced to occupy about two-thirds of the angular space between the two commutator-brushes 1 1'. The result of this arrangement is that the ends of adjacent sections of winding are kept connected so long as they lie between the commutator-brushes of any given pair of brushes. Each pair of poles thus has a certain portion of the armature-winding to act upon, and that portion is entirely disconnected from the rest of the armature-winding. By combining these armature-circuits in various ways, so as to change the number of armature-turns connected in series in the circuit, the speed of the motor can be varied, since the speed of a shunt-motor supplied with current at constant potential varies with the number of series turns of the armature and is independent of the load. In order to effect these combinations, the several commutator-brushes are connected with a controller. Fig. 2 shows in diagram the circuits of a controller adapted to produce the desired changes in speed of a twelve-pole motor. The brushes are divided into six groups 1 1', 2 2', 3 3', &c. Each brush is connected with its corresponding finger $a\ a'$, $b\ b',\ c\ c'$, &c. The positive main P is connected with a finger $r$ through the resistance-coils R R' R², whose terminals are connected with the fingers $r\ r'\ r^2\ r^3$. The field-coil F is in shunt to the armature A', being connected across the mains P N.

At the right of the fingers in Fig. 2 is seen a development of the segments on the controller-cylinder. The segments are arranged in four tiers for a twelve-pole motor. The first tier brings the speed from starting up to about one-sixth of full speed by using the rheostat, all the circuits being in series. The second tier puts the circuits in series multiple, there being three groups of two multiple circuits. This by using the rheostat accelerates the speed to about one-third. The third tier of segments puts the circuits in two groups in series with three in multiple in each group and accelerates the speed to nearly one-half. The fourth tier of segments puts all the circuits in multiple and brings the motor up to full speed. With this explanation it is thought that the diagram will be readily understood without tracing out all the circuits in detail.

It will be observed that only one-half the armature-winding is in use at any given instant, so that as compared with a similar machine giving the same torque at full speed, but with the ordinary multiple armature-winding, the loss due to heat is increased, the other losses remaining the same.

If many poles are used, only every other one may be wound, giving it twice the ampere-turns it would otherwise have. It is evident that the greater the number of poles the greater is the available speed variation.

What I claim as new, and desire to secure by Letters Patent of the United States, is—

1. In a multipolar electric motor, an armature-winding divided into open-circuited sections, and means for varying the speed of said motor by connecting adjacent sections in separate groupings.

2. In a multipolar electric motor, an armature-winding divided into open-circuited sections, a pair of commutator-brushes for each pair of poles, and means for connecting the armature-sections between the brushes of each pair.

3. In a multipolar electric motor, an armature-winding divided into open-circuited sections, a set of equidistant commutator-brushes, each brush being paired with one of those adjacent to it, and means for connecting adjacent armature-sections between each pair of brushes.

4. In a multipolar electric motor, an armature-winding divided into open-circuited sections, and two segmental rings each having a segment for each armature-section, the adjacent ends of said sections being connected with corresponding segments.

5. In a multipolar electric motor, an armature-winding divided into open-circuited sections, two segmental rings having parallel segments, one segment being connected to one end of an armature-section, and the corresponding segment being connected to the adjacent end of the next section, and insulated brushes adapted to bridge said segments.

6. In a multipolar electric motor, an armature-winding divided into open-circuited sections, three sections for each pair of poles, two segmental rings having as many parallel segments as there are sections, the adjacent ends of sections being connected to corresponding segments, and a group of brushes for each pair of poles adapted to bridge said ring-segments at each pair of poles.

7. In a multipolar electric motor, an armature-winding divided into open-circuited sections, three sections for each pair of poles, two segmental rings having as many parallel segments as there are sections, the adjacent ends of sections being connected to corresponding segments, and a group of brushes for each pair of poles adapted to bridge said ring-segments at each pair of poles, said brushes being so spaced as to connect not more than two sections for each pair of poles.

8. In a multipolar electric motor, means for dividing the armature-winding into separate unconnected portions, each portion in circuit with its own pair of brushes and cutting the field produced by its own pair of poles.

9. In a multipolar electric motor, means for dividing the armature-winding into separate unconnected portions, each portion in circuit with its own pair of brushes and cutting the field produced by its own pair of poles, and means for connecting said circuits in series, series multiple, and multiple.

10. In a multipolar shunt-wound electric motor, means for dividing the armature-winding into separate unconnected portions, and a series-parallel controller for connecting said portions to vary the speed of the motor.

In witness whereof I have hereunto set my hand this 19th day of March, 1902.

CHARLES P. STEINMETZ.

Witnesses:
BENJAMIN B. HULL,
HELEN ORFORD.